Feb. 18, 1964 D. R. DAYKIN 3,121,800

PULSE GENERATING CIRCUIT

Filed June 29, 1960

INVENTOR

DONALD R. DAYKIN

BY Charles A. Nearn

AGENT 3,121,800
Patented Feb. 18, 1964

3,121,800

PULSE GENERATING CIRCUIT

Donald R. Daykin, Vestal, N.Y., assignor to International Business Machines Corporation, New York, N.Y., a corporation of New York Filed June 29, 1960, Ser. No. 39,619
8 Claims. (Cl. 307—88)

This invention relates to novel pulse generating circuits and more particularly to such circuits that are utilized to provide pulses of high peak current and short duration to load devices having reactive components.

High peak power pulse sources are frequently required for pulse circuits of computer systems and are particularly desirable as a driving medium for computer circuits using magnetic cores.

Pulse generators are well known in the prior art and include those in which pulses are formed with the aid of an artificial delay line and those in which a reactance is first charged and then discharged through the load. Such pulse generators are capable of generating substantially rectangular voltage pulses which, if applied to a resistive load, will cause substantially rectangular current pulses to flow.

This invention contemplates circuitry which overcomes the disadvantages of conventional pulse generators and uses more efficient and reliable switching mechanism that requires a minimum of external voltage sources. Saturable elements, such as saturable reactors or inductors, are utilized to facilitate the switching problems.

It is an object of this invention to provide a pulse generator which uses saturable elements a switching mechanism.

It is a further object of this invention to provide a high peak current pulse from a relatively low voltage source.

It is another object of this invention to provide a high peak voltage from a relatively low voltage source.

It is a further object of this invention to provide a simplified current pulse generator which contains few components.

It is still a further object of this invention to provide a voltage and current pulse source for driving magnetic core circuits.

It is still another object of this invention to provide a voltage and current pulse source adapted to produce pulses having short rise and fall times.

Briefly ,the invention comprises a transistorized control means for charging a capacitor through the medium of a saturable core utilized as an autotransformer as well as a saturating switch. An inductive element, which is connected in parallel circuit configuration with the load, completes a charging circuit for the capacitor during a charging operation. When the saturable core autotransformer saturates after the charging of the capacitor, the current flow on the capacitor will reverse, and because of a series diode, the impedance of the load circuit becomes small with respect to that of the inductive element ($L_2$) and the capacitor will then discharge into the load. Because of the autotransformer connection, a substantial voltage multiplication can be obtained from a low voltage source, and it is possible to obtain output pulse durations which are much shorter than the turn- on and turn-off times of the transistor control circuit. Such output pulses are particularly useful as a driving medium for many types of core logic circuits frequently employed in computer circuits.

The foregoing and other objects, features and advantages of the invention will be apparent from the following more particular description of a preferred embodiment of the invention, as illustrated in the accompanying drawings.

Figure 1:
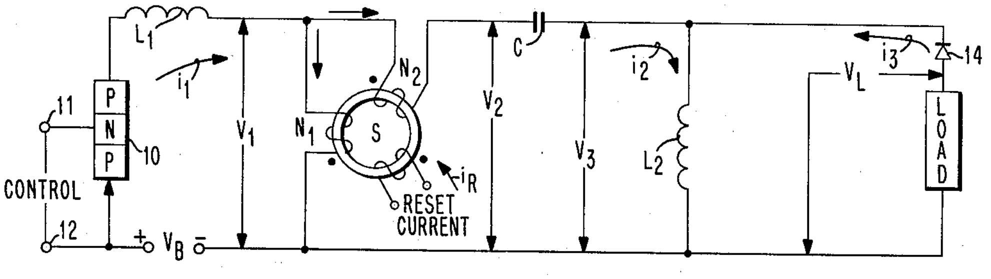
FIG. 1 is a circuit diagram of a preferred embodiment of the invention.

Referring to FIG. 1, a pulse generating circuit embodying the present invention is shown to include a D.C. potential $V_B$ having its positive terminal connected in series circuit combination with a PNP transistor 10 and an inductor $L_1$ which is in turn coupled to the negative terminal of $V_B$ through the parallel circuit comprising the windings $N_1$ and $N_2$ on the core element S, the capacitor C, and the inductor $L_2$. Herein the core element S functions as an autotransformer as well as a switching core having substantially rectangular hysteresis loop properties. Cores having these properties are capable of being switched from one of two possible conditions of magnetization to the other by a magnetizable force exerted by associated electrical windings. The impedance of the windings on the cores changes substantially when the cores reach a state of saturation. In the preferred embodiment the core S has two windings $N_1$ and $N_2$ and a reset winding. Current flowing out of a winding from a dot-marked end is arbitrarily assumed to produce a counterclockwise flux in the core. Stated otherwise, the core is switched in a positive direction. Current flowing into a winding at a dot-marked end then produces a clockwise flux in the core. Stated otherwise, the core is switched in a negative direction.

Figure 2:
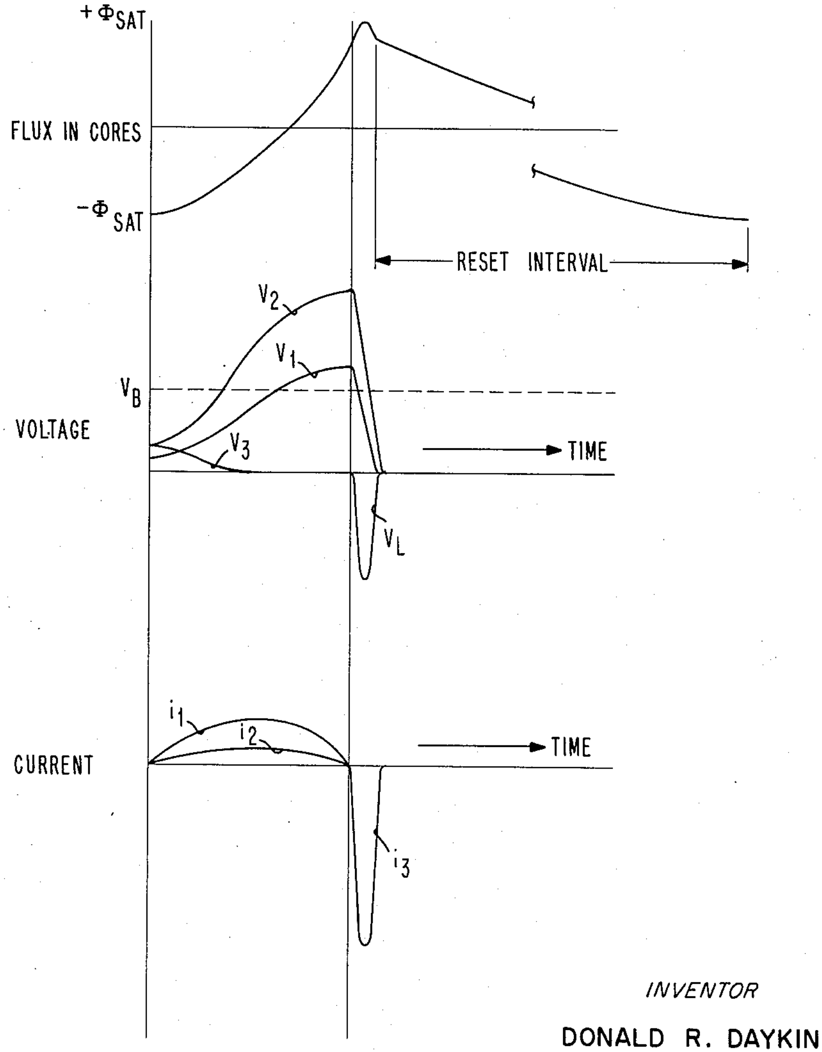
FIG. 2 is a plot of the flux, voltage, and current characteristics of the circuit shown in FIG. 1.

When through the medium of a control signal or pulse applied to the terminals 11 and 12, the PNP transistor 10 is turned On, the resulting current $i_1$ which flows through the inductor element $L_1$ will divide and a portion of it will flow through the winding $N_1$ and the other portion designated as $i_2$ will flow through the winding $N_2$, the capacitor C and the inductor $L_2$ serving to charge the capacitor C. There is no current flow through the load due to the manner in which the diode 14 is oriented. During the charging interval for the capacitor C, the core element S is being switched to a positive direction by the current flow through the winding $N_1$ and $N_2$. The ampere turns of $N_1$ will exceed those of $N_2$ by an amount sufficient to cause switching of the core at a rate such that counter E.M.F. $V_1$ will be developed across $N_1$. Through the medium of design, the switching of the core element S will be completed approximately coincident with the voltage $V_2$ reaching a peak value, as indicated in the voltage waveforms of FIG. 2.

When the core element S saturates in the positive direction, the impedance of the windings $N_1$ and $N_2$ becomes substantially lower and permits the charged capacitor C to discharge rapidly through the low saturated impedance at windings $N_1$ and $N_2$ into the impedance of the load, thereby producing a substantially larger current in the load with respect to the current which flowed during the time the capacitor C was being charged. Consequently, a substantial current multiplication can be obtained in this manner (see the current waveforms of FIG. 2), and it is possible to produce output current pulses of much shorter durations than the turn-on and turn-off times of the transistor 10. During the discharge interval for the capacitor C, the impedance of the inductance $L_2$ is negligibly high as compared to the load impedance and practically all of the current flow will be through the load. Such pulses are extremely useful for driving many types of core logic such as is frequently used in present-day computer circuits.

A novel feature of the invention resides in the fact that the voltage $V_2$ to which the capacitor C can be charged may be many times the supply voltage $V_B$ and is dependent upon the turns ratio of the autotransformer or core element S, as indicated in the formula $$V_2=\frac{N_2+N_1}{N_1}V_1$$

In many cases this condition removes an undesirable restriction on the maximum load impedance that can be handled by a pulse generating circuit operated by a fixed source of voltage $V_B$.

At the termination of the discharge pulse or shortly before the termination of the discharge pulse, the transistor 10 is turned off. After the discharge of the capacitor C, the application of a reset pulse causes a current $i_R$ to flow through the reset winding on the core element S and thereby switches the core element S to its negative direction. As an alternative arrangement, the reset pulse can be constantly applied to the reset winding of the core element S with the charging current through the transistor 10 during the charging intervals for capacitor C being sufficient to overcome the current flow in the reset winding of the core element S, thereby causing the magnetic flux of the core element S to switch to its positive direction.

While the invention has been particularly shown and described with reference to a preferred embodiment thereof, it will be understood by those skilled in the art that various changes in form and details may be made therein without departing from the spirit and scope of the invention.

What is claimed is:

1. A pulse generating circuit comprising energy storing means; first switching means; a voltage source; a circuit for charging said energy storing means from said voltage source comprising second switching means, a first inductive element, said first switching means, and said energy storing means; means for activating said second switch means to render said charging circuit conductive; and a circuit for discharging said energy storing means comprising in series circuit arrangement said energy storing means, said first switching means, a load, and a diode serving to control the direction of current flow through said load, said first switching means being responsive to the charging current for said energy storing means for rendering said discharge circuit conductive after said energy storing means has been charged.

2. A pulse generating circuit comprising energy storing means; first switching means; a voltage source; a circuit for charging said energy storing means from said voltage source comprising second switching means, a first inductive element, said first switching means, said energy storing means, and a second inductive element; means for activating said second switch means to render said charging circuit conductive; and a circuit for discharging said energy storing means comprising in series circuit arrangement said energy storing means, said first switching means, a load, and a diode serving to control the direction of current flow through said load, said first switching means being responsive to the charging current for said energy storing means for rendering said discharge circuit conductive after said energy storing means has been charged.

3. A pulse generating circuit comprising energy storing means; first switching means; a voltage source; a circuit for charging said energy storing means from said voltage source comprising second switching means, a first inductive element, said first switching means, said energy storing means, and a second inductive element; means for activating said second switch means to render said charging circuit conductive; a circuit for discharging said energy storing means comprising in series circuit arrangement said energy storing means, said first switching means, a load, and a diode serving to control the direction of current flow through said load, said first switching means being responsive to the charging current for said energy storing means for rendering said discharge circuit conductive after said energy storing means has been charged; and means for resetting said first switching means.

4. A pulse generating circuit comprising an energy storing device; a magnetic core switching means exhibiting a substantially rectangular hysteresis loop property and having a first and a second coil winding inductively coupled thereto; a voltage source; a circuit for charging said energy storing device from said voltage source comprising second switching means, a first inductive element, the second coil winding of said magnetic core switching means, said energy storing device, and a second inductive element; a source of control pulses connected to said second switching means for rendering said charging circuit conductive periodically, the first winding of said magnetic core switching means being in parallel circuit arrangement with the second coil winding of said magnetic core switching means, said energy storing device and second inductive elements and serving to assist in magnetically saturating said core switching means in a given direction; a circuit for discharging said energy storing device comprising in series circuit arrangement said energy storing device, said second and first coil windings of said magnetic core switching device, a load, and a diode serving to control the direction of current flow through said load, said magnetic core switching device being responsive to the charging current for said energy storing device for rendering said discharge circuit conductive after said energy storing device has been charged.

5. A pulse generating circuit comprising an energy storing device; a magnetic core switching means exhibiting a substantially rectangular hysteresis loop property and having a first and a second coil winding inductively coupled thereto; a voltage source; a circuit for charging said energy storing device from said voltage source comprising second switching means, a first inductive element, the second coil winding of said magnetic core switching means, said energy storing device, and a second inductive element; a source of control pulses connected to said second switching means for rendering said charging circuit conductive periodically, the first winding of said magnetic core switching means being in parallel circuit arrangement with the second coil winding of said magnetic core switching means, said energy storing device and second inductive elements and serving to assist in magnetically saturating said core switching means in a given direction; a circuit for discharging said energy storing device comprising in series circuit arrangement said energy storing device, said second and first coil windings of said magnetic core switching device, a load and a diode serving to control the direction of current flow through said load, said magnetic core switching device being responsive to the charging current for said energy storing device for rendering said discharge circuit conductive after said energy storing device has been charged; a reset coil winding on said mangetic core switching means; and means for selectively energizing said reset coil winding to reset said magnetic core switching means to its original state of magnetic saturation.

6. A pulse generating circuit comprising a capacitor; a transformer having first and second windings; a voltage source; a circuit for charging said capacitor from said voltage source comprising a transistor having an emitter, a collector, and base, a first inductor element, the second winding of said transformer, said capacitor, and a second inductor element; a source of control pulses connected to the base of said transistor for rendering said charging circuit conductive periodically; the first winding of said transformer being in parallel circuit arrangement with the second winding of said transformer, said capacitor and second inductor element and serving to assist in magnetically saturating the core of said transformer in a given direction; and a circuit for discharging said capacitor comprising in series circuit arrangement said capacitor, the second and first windings of said transformer, a load, and a diode serving to control the direction of current flow through said load, said transformer being responsive to the charging current for said capacitor for rendering said discharge circuit conductive after said capacitor has been charged.

7. A pulse generating circuit comprising a capacitor; a transformer having first and second windings; a voltage source; a circuit for charging said capacitor from said voltage source comprising a transistor having an emitter, a collector, and base, a first inductor element, the second winding of said transformer, said capacitor, and a second inductor element; a source of control pulses connected to the base of said transistor for rendering said charging circuit conductive periodically; the first winding of said transformer being in parallel circuit arrangement with the second winding of said transformer, said capacitor and second inductor element and serving to assist in magnetically saturating the core of said transformer in a given direction; a circuit for discharging said capacitor comprising in series circuit arrangement said capacitor, the second and first windings of said transformer, a load, and a diode serving to control the direction of current flow through said load, said transformer being responsive to the charging current for said capacitor for rendering said discharge circuit conductive after said capacitor has been charged; a reset winding on said transformer; and means for selectively energizing said reset winding to reset the core of said transformer to its original state of magnetic saturation.

8. A pulse generating circuit comprising a capacitor; a transformer having first and second windings; a voltage source; a circuit for charging said capacitor from said voltage source to a voltage which is a multiple of said voltage source and being a function of the turns ratio of the windings on said transformer, said charging circuit comprising a transistor, a first inductor element, the second winding of said transformer, said capacitor, and a second inductor element; a source of control pulses connected to said transistor for rendering said charging circuit conductive periodically; the first winding of said transformer being in parallel circuit arrangement with the second winding of said transformer, said capacitor and second inductor element and serving to assist in magnetically saturating the core of said transformer in a given direction; a circuit for discharging said capacitor comprising in series circuit arrangement said capacitor, the second and first windings of said transformer, a load, and a diode serving to control the direction of current flow through said load, said transformer being responsive to the charging current for said capacitor for rendering said discharge circuit conductive after said capacitor has been charged; a reset winding on said transformer; and means for selectively energizing said reset winding to reset the core of said transformer to its original state of magnetic saturation.

References Cited in the file of this patent

UNITED STATES PATENTS

| | | |
|---|---|---|
| 2,416,718 | Shockley | Mar. 4, 1947 |
| 2 436.395 | Manley et al. | Feb. 24, 1948 |